United States Patent [19]

Bühler et al.

[11] Patent Number: 5,438,178

[45] Date of Patent: Aug. 1, 1995

[54] METHOD OF PRECISION ELECTRIC-DISCHARGE MACHINING EMPLOYING ELECTRODES IN THE FORM OF WIRES, AND APPARATUS FOR CARRYING OUT THE METHOD

[75] Inventors: Ernst Bühler, Losone; Livio Mazzolini, Ponte Capriasca; Rino D'Amario, Taverne, all of Switzerland

[73] Assignee: AG für industrielle Elektronik, Losone, Switzerland

[21] Appl. No.: 87,951

[22] Filed: Jul. 6, 1993

[30] Foreign Application Priority Data

Jul. 6, 1992 [DE] Germany ............ 42 22 186.2

[51] Int. Cl.⁶ .................................................. B23H 7/06
[52] U.S. Cl. .................................. 219/69.12; 219/69.17
[58] Field of Search ............... 219/69.12, 69.16, 69.2, 219/69.17

[56] References Cited

U.S. PATENT DOCUMENTS

| | | | |
|---|---|---|---|
| 4,673,787 | 6/1987 | Inoue | 219/69.12 |
| 4,751,362 | 6/1989 | Girardin | 219/69.12 |
| 4,843,203 | 6/1989 | Gamo et al. | 219/69.12 |
| 4,970,362 | 11/1990 | Ono | 219/69.12 |

FOREIGN PATENT DOCUMENTS

| | | | |
|---|---|---|---|
| 56-146626 | 11/1981 | Japan | 219/69.12 |
| 60-221220 | 11/1985 | Japan | 219/69.12 |
| 62-44318 | 2/1987 | Japan | 219/69.12 |
| 64-40220 | 2/1989 | Japan | 219/69.12 |
| 1-205927 | 8/1989 | Japan | 219/69.12 |
| 3-121721 | 5/1991 | Japan | 219/69.13 |
| 2131204 | 6/1984 | United Kingdom | 219/216 |

*Primary Examiner*—Geoffrey S. Evans
*Attorney, Agent, or Firm*—Egli International; Christa Hildebrand

[57] ABSTRACT

A method of precision electric-discharge machining carried out in apparatus of moderately high precision and stability with an electrode in the form of a wire. The object is a surface as smooth as the surface that can be obtained with the more expensive very high-precision apparatus. The contour of work that has already been roughed out at least once is accordingly exploited as a geometrical reference for at least one finishing cut. The gap is maintained constant by fine adjustments.

31 Claims, 4 Drawing Sheets

METHOD OF PRECISION ELECTRIC-DISCHARGE MACHINING EMPLOYING ELECTRODES IN THE FORM OF WIRES, AND APPARATUS FOR CARRYING OUT THE METHOD

BACKGROUND OF THE INVENTION

1. Field of the Invention

The present invention concerns, a method and apparatus of precision electric-discharge machining.

One object of the invention is a thoroughgoing improvement in the known method whereby in spite of a wide range of such destructive actions as thermal distortion of the apparatus or vibrations and stress in the work, a high-quality product surface can be attained even with a relatively simple apparatus.

2. Description of the Prior Art

Work that can be electric-discharge machined to a surface roughness of 0.1 $\mu$m with a very high-precision apparatus in a specially air-conditioned environment is known.

Polishing electric-discharge machined products electrochemically with the same wire cathode and with a powerful electrolyte is also known. When direct currents of approximately 3 A are employed, the higher surface elevations can be removed.

A very high-precision apparatus has drawbacks. It costs about three times as much as a moderately high-precision apparatus. Operating at temperature gradients of no more than 1 K over 24 hours, it cannot be accommodated in the average shop. Most applications on the other hand require only very smooth surfaces and not necessarily a very precise geometry. The electrochemical approach is extremely difficult to integrate into an electric-discharge machining system because the dielectric usually has a conductivity of 10 $\mu$S/cm and it is almost impossible to separate the electrolyte from the dielectric. Furthermore, some materials that are markedly crystalline are almost impossible to polish because the agents attack different phases at different rates.

Other references will now be cited in supplement, although they do not necessarily address obtaining smooth surfaces with a moderately high-precision apparatus. German OS 3 929 111 A1 discloses a method of calculating displacement of an electric-discharge machining wire that does not require the entry of as much data to store offsets for roughing-out and finishing strokes. European Patent 0 312 056 A1 discloses a sensor that detects the position of an electric-discharge machining wire. K. Spanner and L. Dietrich, Feinste Positionierung mit Piezoantrieben, Feinwerktechnik & Messtechnik 87 (1979), 4, 181 describes using piezoelectric drive mechanisms for precision adjustment. The article describes laboratory instruments, however, and not machine tools. German OS 3 907 656 A1 discloses a precision tool with a system that senses the position of the work and with mechanisms that control it. German Patent 3 524 377 C2 discloses a system of guiding a wire through a C-shaped apparatus. German OS 3 813 306 discloses an electric-discharge machining apparatus with a device that detects surface-shaping errors by measuring the distance between a wire electrode moving along a prescribed reference path and the edge of the product. The frame of reference is either the apparatus itself or its coordinate system. Negative feedback is employed to compensate for the measured errors with high-precision electric discharge. The purpose of the sensor is to obtain highly precise contours and shapes and not to obtain smooth surfaces in moderately high-precision apparatus.

SUMMARY OF THE INVENTION

The present invention is intended to leave very smooth surfaces, with elevations down to below 0.1 $\mu$m, when carried out on a moderately high-precision electric-discharge machining apparatus of the type found in an ordinary shop. The invention also addresses a machining apparatus particularly appropriate for carrying out the method.

This object is attained in a method and apparatus of precision electric-discharge machining with a wire electrode wherein the contour of a roughed out cut in a work piece is utilized as geometrical reference for at least one finishing cut.

A method of precision electric-discharge machining carried out in an apparatus of moderately high precision and stability with an electrode in the form of a wire is characterized in that the contour of the work that has already been roughed out at least once is exploited as a geometrical reference for at least one finishing stroke.

The particular advantage of the invention is that the apparatus does not need to be of absolute precision in order to turn out products precise enough to be used as metal-casting patterns for example without any wire-electrode electric-discharge finishing strokes. Another advantage is that the method does not add much expense to the apparatus.

The method can, to an advantage, employ pulses weak enough to produce a mirror surface (with elevations of less than 0.1 $\mu$m) on a moderately high-precision apparatus operating in an ordinary shop in that the spark gap is narrower than the machining tolerance.

The width of the gap between the work (2) and the wire (4) is determined in one particularly preferred embodiment of the invention by measuring at least one of the gap's electric parameters and fine adjustments superimposed over the cut that roughs out the geometry are initiated at a right angle to the roughing-out cut and at constant finishing-cut speed to maintain the gap parameter and hence the width of the gap constant.

An upper photosensor and a lower photosensor detect the brightness of the discharge in the vicinity of operations above and below the work and fine adjustments are initiated that tilt the wire at a right angle to the roughing-out cut, maintaining the brightness of the discharge above and below the work at the same level and the wire vertically paralleling the side of the work.

When there are several finishing cuts to be made along straight or slightly curved sections, the wire can be tilted back and forth along the cut to a certain extent while producing those cuts.

The position and shape of the work can be detected by sensors just prior to initiation of the finishing cut and the results employed to revise the program by coordinate translation and rotation and offset correction to match the foregoing product.

The fine adjustments are carried out in another preferred version of the invention in accordance with the axes inherent in the apparatus. It is also advantagous to determine the fine adjustments by way of the apparatus-inherent offset correction, which is maintained constant by measurements of the electric gap parameters or by the photosensors, and hence maintains the width of the gap constant.

Particularly advantageous results can also be obtained if the fine adjustments are carried out with servo mechanisms in the form of piezo-electric actuators. The servo mechanisms can on the other hand be actuators that linearly deform resilient components. It is preferred for the resilient components to be part of the apparatus or of a tool holder and subjected to regulated pneumatic or hydraulic pressure. The actuators in other preferred versions of the invention generate force electromagnetically or by heating and/or cooling and accordingly varying the length of a temperature sensitive mass. The servo mechanisms preferably act only by way of the tool holder and come into action prior to the roughing-out stage to fine-adjust the orientation of the work.

Another preferred embodiment of the invention uses ultrasound sensors instead of photosensors, and their signals are processed in synchronization with the generator, whereby the distribution of sparks between the top and the bottom of the work is determined by measuring the duration and intensity of the sound.

The deviation of the fine adjustments are displayed numerically or graphically to the operator in another advantageous version of the invention and an alarm is released when a maximum deviation is transgressed and processing discontinued at least as long as the transgression exists. It is furthermore of particular advantage to display the outline of the work on a monitor with the deviations in the fine adjustments powerfully magnified in the form of discrepancies from the outline.

The servo mechanisms in another especially preferred advanced modification of the invention can advantageously correct shaft or apparatus errors, precisely orient the work or the wire, precisely compensate for deviations of the wire detected by a wire-position sensor, correct offset or finishing-cut errors or all of these functions.

BRIEF DESCRIPTION OF THE DRAWINGS

Embodiments of the invention will now be specified with reference to the drawings, wherein.

DESCRIPTION OF PREFERRED EMBODIMENTS

Figure 1:
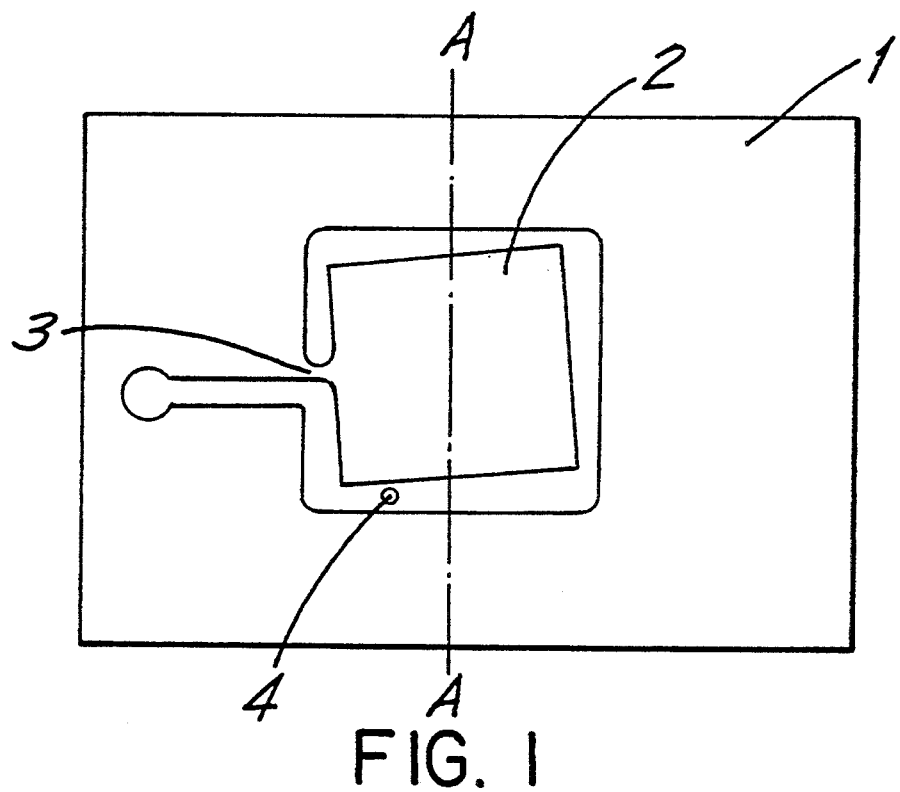
FIG. 1 illustrates a work exhibiting horizontal angular displacement, exaggerated in the drawing, in relation to the blank as a result of stresses in the material.

FIG. 1 illustrates a blank 1 with a partly roughed-out work 2 physically and electrically still united to it by a web 3. The displacement that occurs to work 2 when the rough cutting intersects the lines of force of the material's inherent tension is drawn exaggerated.

Rough cutting can also generate heat and stress that easily distort the apparatus itself, resulting in vertical angular displacement of the work 2 in relation to the electrode, which is in the form of a wire 4. Machine-tool steel typically expands 12 $\mu$m per K of temperature and per meter of length. This property can of course be compensated for to some extent by intelligent design, although considerable errors will always remain.

Figure 2:
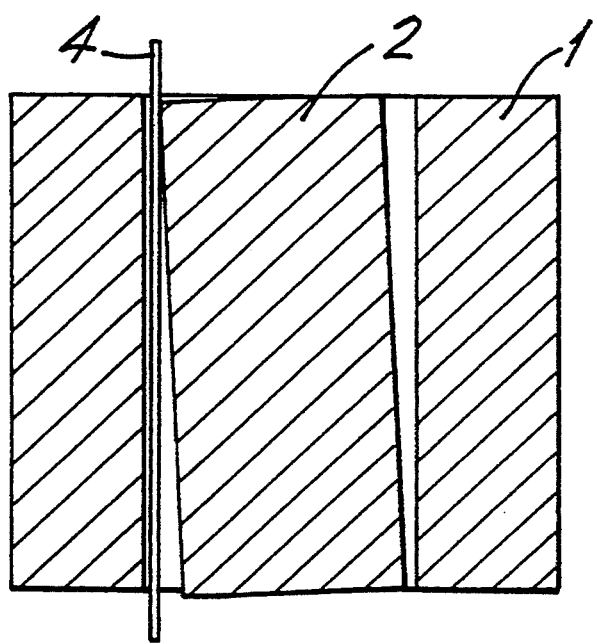
FIG. 2 is a section through the same work along the line A—A, showing vertical angular displacement, also exaggerated, from the same cause.

FIG. 2 is a section through the same blank 1, showing how far, again drawn exaggerated, work 2 has been tilted out of the vertical due to the release of material-inherent stress. A finishing stroke that has not been corrected in accordance with the invention would address only the top left and bottom right of work 2. The thicker the work is vertically, the more obvious the error will be.

Even a very high-precision electric-discharge machining apparatus operating in a specially air-conditioned environment, however, cannot correct such errors.

Figure 3:
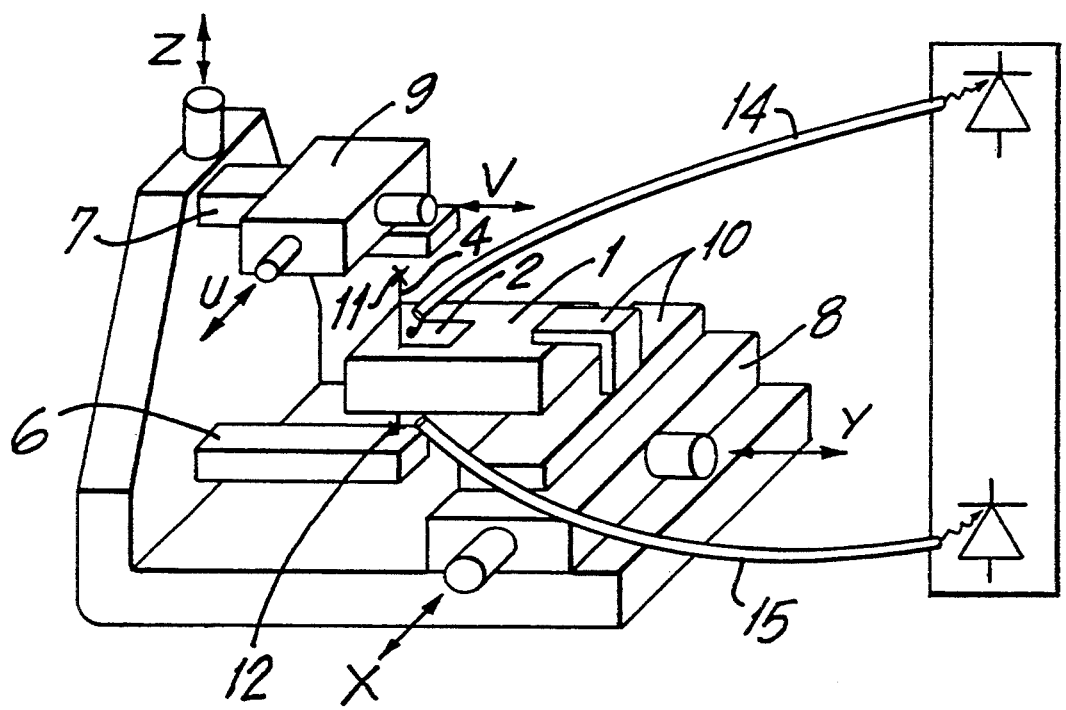
FIG. 3 illustrates an electric-discharge machining apparatus of moderately high precision with photosensors.

FIG. 3 illustrates a conventional moderately high-precision electric-discharge machining apparatus. Moderately high precision is an absolute axes-positioning precision of approximately 5 $\mu$m, a turnaround tolerance of approximately 2 $\mu$m, and a within-the-axes path resolution of 1 $\mu$m. The apparatus comprises a base 5, a lower arm 6, an upper arm 7, an X-Y coordinate carriage 8, a U-V coordinate carriage 9, and a work holder 10. Upper arm 7 can be raised and lowered to the level of work 2 along the Z axis. An upper wire guide 11 can be displaced along the U axis and V axis in relation to a lower wire guide 12 to tilt the wire and cut slanting edges.

The pulses responsible for the first rough cut in the process of cutting work 2 out of blank 1 have amplitudes of several hundred amperes and a duration of approximately 2 $\mu$sec.

The resulting lateral gap between wire 4 and work 2 is typically 60 $\mu$m. The surface has elevations of approximately 2 $\mu$m and is not smooth enough for most applications. The finishing-cut approach was developed a long time ago to improve the surface and correct small geometrical errors. In this technique the work is remachined several times with appropriate offset corrections at constantly lower amplitudes and briefer pulses. The results are not only a smoother surface but also a much narrower gap. At pulses of approximately 2 A and approximately 0.3 $\mu$sec the surface elevations will be approximately 0.2 $\mu$m high and the gap approximately 3 $\mu$m wide. The various mechanical errors encountered in a moderately high-precision electric-discharge machining apparatus are particularly pronounced at this threshold. They will be accompanied by thermally dictated errors and by those described with reference to FIGS. 1 and 2.

Reproducible results cannot be achieved below this threshold because there will be no abrasion at all in some areas of the work due to short circuits and idling.

It makes no sense at all to employ constantly higher-precision apparatuses in more powerfully air-conditioned environments, partly because the errors illustrated in FIGS. 1 and 2 will still occur and partly because the equipment will be unacceptably expensive. The present invention provides a simple strategy for decisively crossing this threshold.

The main idea is to exploit the intermediate product of one or more roughing-out cuts instead of the apparatus itself as an absolute reference for the finishing strokes. The number of roughing-out cuts depends on how many geometrical errors are permissible.

The first tactic is to increase the resolution of the coordinates in order to allow movements in the submicrometric range without increasing the absolute precision of the apparatus. If the apparatus is powered by a stepper, the best solution is to electronically reduce the increments. For other types of motor it will be possible to increase the resolution of the route meter. The direction of the cut, meaning the slope or sine-to-cosine ratio, is known from the numerical control, and a normal to the cut can be determined from a 90° rotation. Fine adjustments can now in accordance with the invention be initiated in this transverse direction with the objective of constantly maintaining the lateral gap at an ideal width. An appropriate offset correction and generator parameters and a constant cutting speed are also, as in the known finishing-cut technique, selected. What is new in accordance with the invention is that at least one electric-gap parameter—mean operating voltage, mean operating current, or mean ignition delay for example—is measured and compared with a reference. If there is any discrepancy, the fine adjustments are initiated by advancing or withdrawing the work until the discrepancy approaches zero. These measures will make the wire conform to the incorrect position of the work illustrated in FIG. 1.

Any incorrectly selected offset corrections and thermally or mechanically occasioned malfunctions on the part of the apparatus must, however, also be corrected. The result will be abrasion of a uniform thickness of material from the total circumference of the work. The vertical angular displacement of the work 2 illustrated in FIG. 2 can of course not be corrected in this way. To do so requires still another sensor to detect the distribution of sparks along the height of the work. FIG. 3 illustrates one approach. An upper photosensor 14 and a lower photosensor 15, which can be optical conductors, detect the brightness of the discharge in the vicinity of operations above and below the work 2. Differences are calculated in a processor 13. The signal leaving processor 13 initiates fine adjustments in the U-V plane that maintain the brightness of the discharge above and below the work 2 at the same level. Wire 4 is accordingly tilted in this event as well at an angle to the cutting direction by the numerical controls.

There are other ways of sensing the spark distribution along the height of the work. Ultrasonic sensors for example can detect the intensity of the sound of the sparks instead of photosensors detecting the brightness of the discharge. Since the sound waves will be considerably attenuated over the height of the work, their amplitude can also provide information about distance. Distance can, however, also be determined by how long the waves last if the interval from when the sound is generated to when it is intercepted by the sensors is measured.

Other techniques of sensing the distribution of the sparks exploit the impedance of wire 4 along with differential current and voltage measurements for similar results. These approaches, however, become more and more unreliable as the amplitude of the current decreases and are accordingly not as appropriate. The wire will at any rate in consequence of these fine adjustments conform to the vertical errors of work 2 illustrated in FIG. 2.

Figure 4:
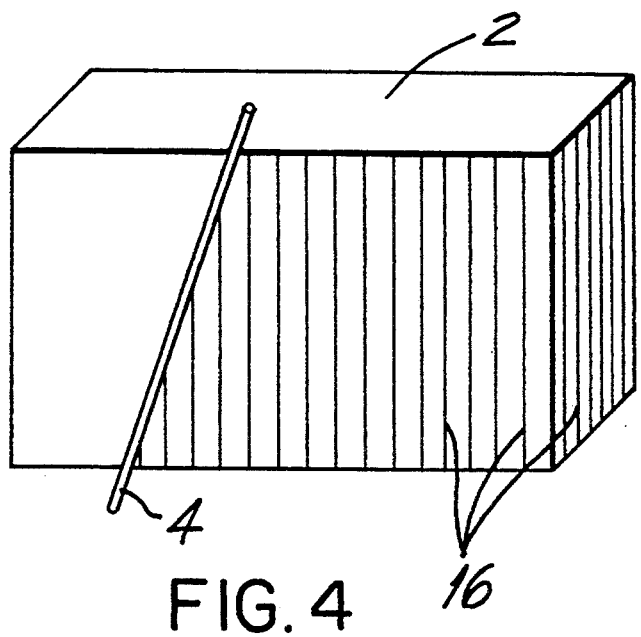
FIG. 4 illustrates vertical striations being removed from the work by a wire that slants along the incision.

FIG. 4 illustrates work 2 that, in spite of repeated finishing, continues to exhibit vertical striations 16, although hardly visible. Striations 16 are mostly low elevations in the submicrometric range and 0.5 mm apart for example. There may be many reasons for these ridges, like small point-like defects in the work's crystalline structure, errors in the diameter of the wire, or vibrations that impact the overall apparatus. The problem is that each striation 16 is engaged only very briefly during the finishing process and can accordingly hardly be smoothed off. In accordance with the present invention, however, the wire can be tilted back and forth slightly along the cut when producing finishing cuts along straight or only slightly curved sections. The numerical controls will generate the tilt by shifting the U-V coordinate stage 9, allowing the wire to abrade at an angle and remain in contact longer with each striation 16 during the finishing process so that their treatment will have priority. Although the ideal angle will occur when upper wire guide 11 is displaced approximately 0.5 mm, the distance between one striation and the next, from lower wire guide 12, even 0.1 mm will result in improvement.

When a smooth final surface is not particularly important and especially when the machining is carried out with high absolute-precision apparatus in a specially air-conditioned environment, it may be completely satisfactory to detect the position and shape of the work immediately before initiating the finishing stroke. Wire-position sensors like those disclosed in German Patent 2 826 270 (U.S. Pat. No. 4,232,208) are now available. These sensors can be employed to detect and correct the position of wire 4 in relation to wire guides 11 and 12. Such sensors also allow high-precision non-electric detection in the submicrometric range.

Figure 5:
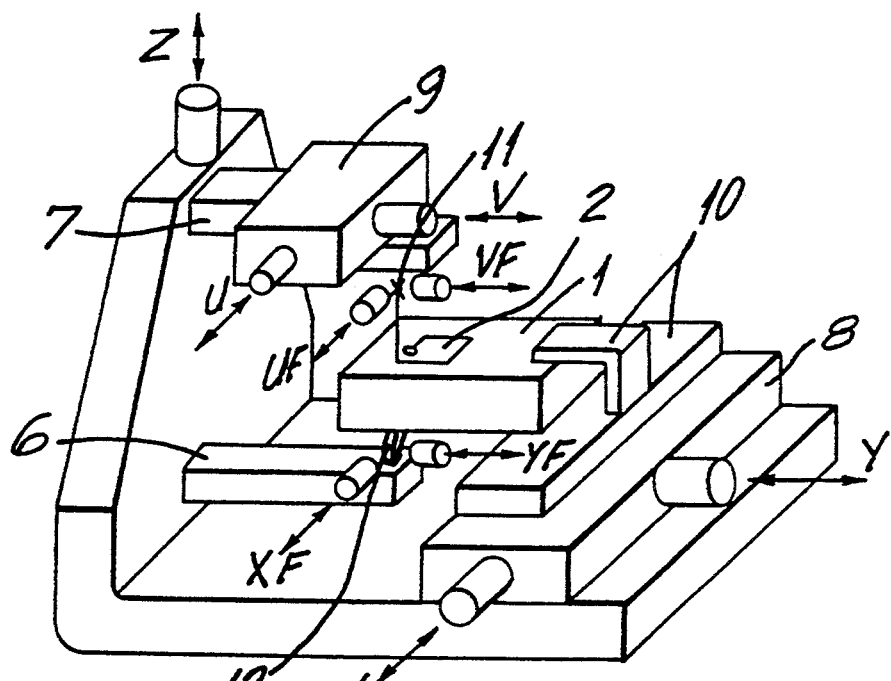
FIG. 5 illustrates a moderately high-precision electric-discharge machining apparatus with mechanisms that fine-adjust the wire guides.

A permanently resident program makes it possible to detect parallel displacements of work of any shape along the X and Y axes and its angle of rotation around the X, Y, or Z axes (an Eulerian-rotation matrix). It is also possible to measure the actual size of the work and derive the appropriate offset correction from it. This feature makes it possible to compensate not only for wire-dimension errors but also for heat expansion of the work. The coordinates stored in the numerical-control program will now be displaced and rotated to correspond with the empirically determined position of the work. The requisite mathematical matrix operations are known (cf. e.g. W. Knapp, Software Geometriekorrektur, Technischen Rundschau 39 (1987), Hallwag, Bern, Switzerland, and the references cited therein). FIG. 5 illustrates an embodiment of the invention with servo mechanisms XF and YF on lower wire guide 12 and servo mechanisms UF and VF on upper wire guide 11. Servo mechanisms XF & YF and UF & VF can be piezo-electric actuators of the type known from German Patent 3 048 631 (U.S. Pat. No. 4,423,347). Such components allow very precise and rapid action even in the submicrometric range. This design is particularly practical to compensate for low-frequency vibrations in the apparatus, which are difficult to cushion mechanically. Servo mechanisms XF & YF and UF & VF can of course alternatively be electromagnetic.

Figure 6:
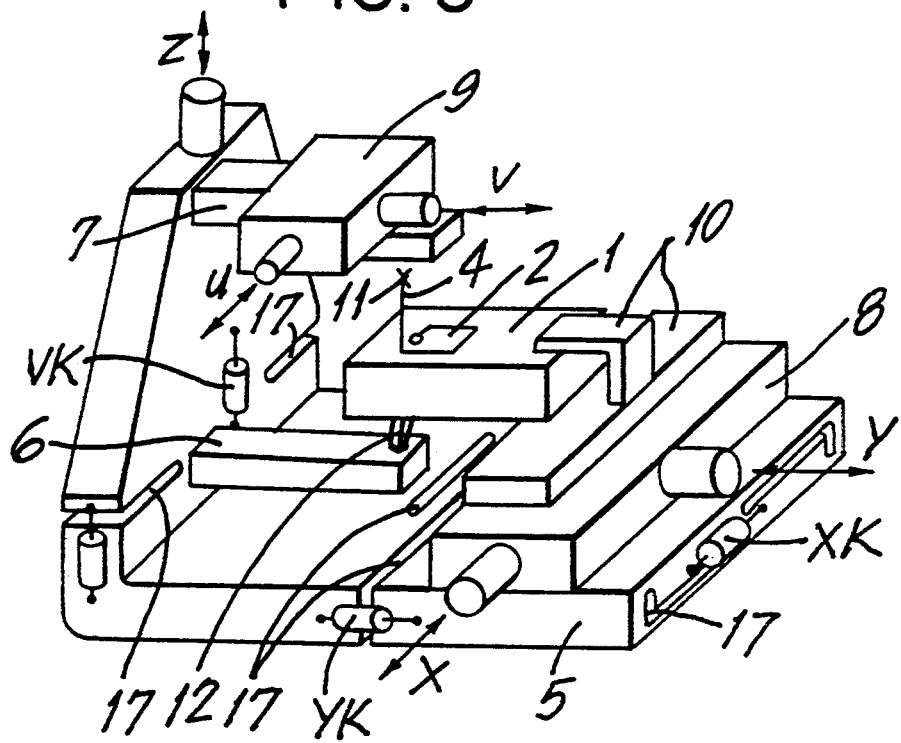
FIG. 6 illustrates a moderately high-precision electric-discharge machining apparatus with actuators that act on the structure of the apparatus.

FIG. 6 illustrates another approach to fine adjustments. The concept behind this embodiment is to allow actuators XK, YK, UK, and VK to act on the resilient components of the apparatus and introduce controlled attenuations 17. Such actuators XK, YK, UK, and VK can for example be mounted on upper arm 7 and lower arm 6.

The force can be applied by pressure-activated short-stroke pneumatic or hydraulic piston-and-cylinder mechanisms although electromagnetic components can also be employed. When slower but high-precision action is necessary, temperature-sensitive expanding masses of brass or an appropriate (e.g. memory-retaining) alloy that stretch or shrink in response to specific temperatures can be employed.

Figure 7:
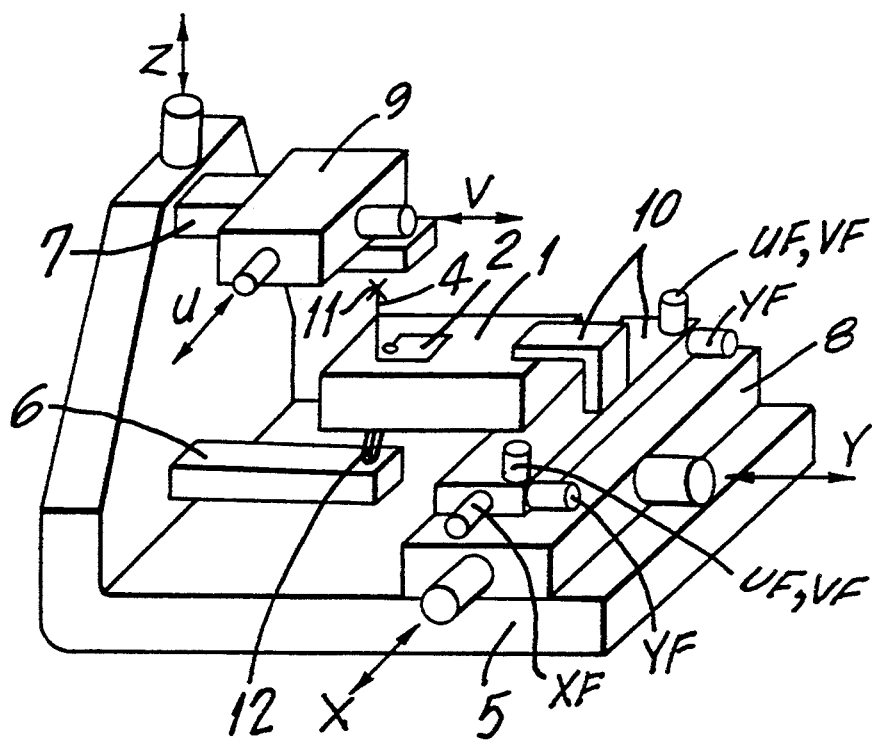
FIG. 7 illustrates a moderately high-precision electric-discharge machining apparatus with mechanisms that fine-adjust the work holder.

FIG. 7 illustrates an embodiment which is especially appropriate for refitting a moderately high-precision apparatus. Servo mechanisms XF & YF and UF & VF are in this embodiment integrated into work holder 10. Actuators XK, YK, UK, and VK could of course also be employed.

Although the points of rotation of the axis-of-tilt servo mechanisms UF and VF in this embodiment do not always coincide with the axis of wire 4, the situation can be ignored when the work is small enough and the fine adjustments insignificant. The result is more than compensated for by the advantage of simple modifiability.

Another advantage is the possibility of automatically precision orienting the blank 1 while the apparatus is being readied. Looseness is detected by sensors and immediately compensated for by servo mechanisms XF & YF and UF & VF or actuators XK, YK, UK, and VK. The blank's major axes will accordingly coincide with the axes X, Y, U, V, and Z of the apparatus, with the advantage that no linear-interpolation errors can be introduced in these directions by the numerical controls.

It is practical to provide the operator with a point of departure for fine adjustments. Deviations in the adjustments executed by servo mechanisms XF & YF and UF & VF are accordingly displayed numerically or graphically in accordance with the invention.

It is also practical to be able to discontinue processing when the deviations exceed a permissible range. This may occur for example when the apparatus gets too hot. Operations can resume automatically once the distortions have been eliminated from the apparatus.

Further information of value to the operator is displayed on a monitor in the form of an outline of the work with the fine adjustments that occur in conjunction with the finishing strokes displayed as highly magnified deviations from a reference outline. A different color or a dotted line can be employed. The operator can tell from this information whether he has made the wrong offset correction or what the apparatus was doing just before an operation was discontinued due to an excessive deviation from the outline. The monitor functions more or less as a microscope.

Servo mechanisms XF & YF and UF & VF can, depending on their design, be employed even simultaneously to some extent for additional functions. The aforesaid precision orientation of blank 1 is one possibility, and shaft corrections and apparatus corrections, which are conventionally executed in increments of 1 μm, can be much more precise. The aforesaid sensor-initiated wire-position correction can be done in this way, and even offset corrections are possible over a wider range. The consequence of the last feature is that offset correction can be divorced from path interpolation, which allows the offset correction to vary over the outline. There are also advantages associated with interventions to improve the usually serious distortions that occur with more curved paths.

We claim:

1. Method of precision electric-discharge machining carried out in an apparatus of moderately high precision and stability with an electrode in the form of a wire comprising the steps of rough cutting a work at least once; and geometrically referencing for fine adjustments for at least one finishing cut the contour of the work that has already been roughed cut, and at least one step of finish machining to polish the rough cut contour of the work piece.

2. Method as in claim 1, wherein the deviation of the fine adjustments are displayed numerically or graphically to the operator and an alarm is released when a maximum deviation is transgressed and processing discontinued at least as long as the transgression exists.

3. Method as in claim 2, wherein the outline of the work is displayed on a monitor with the deviations in the fine adjustments powerfully magnified in the form of discrepancies from the outline.

4. Method as in claim 1 further comprising the step of tilting the wire back and forth along the cut when there are several finishing cuts to be made along straight or slightly curved sections.

5. Method as in claim 1 further comprising the steps of detecting the position and shape of the work by sensors just prior to the initiation of the finishing cut; and employing the detected results to revise a program by coordinate translation and rotation and offset correction to match the work.

6. Method as in claim 1 wherein the fine adjustments are carried out in accordance with axes X, Y, U and V of the apparatus.

7. Method as in claim 1 further comprising the step of determining the fine adjustments by way of offset correction, which is maintained constant by measurements of the electric gap parameters and hence maintains the width of the gap constant.

8. Method as in claim 1 wherein the fine adjustments are carried out with servo mechanisms (XF & YF and UF & VF).

9. Method as in claim 8, wherein the servo mechanisms (XF & YF and UF & VF) are piezo-electric actuators.

10. Method as in claim 8, wherein the servo mechanisms are actuators (XK, YK, UK, & VK) that linearly deform resilient components.

11. Method as in claim 10, wherein the resilient components are parts (5, 6, or 7) of the apparatus or of a tool holder (10).

12. Method as in claim 10, wherein the actuators (XK, YK, UK, & VK) are subjected to regulated pneumatic or hydraulic pressure.

13. Method as in claim 10, wherein the actuators (XK, YK, UK, & VK) generate electromagnetic force.

14. Method as in claim 10, wherein the actuators (XK, YK, UK, & VK) generate force by heating and/or cooling and accordingly varying the length of a temperature-sensitive mass.

15. Method as in claim 8, wherein the servo mechanisms (XF & YF and UF & VF) act only by way of the tool holder (10).

16. Method as in claim 8, wherein the servo mechanisms (XF & YF and UF & VF) come into action prior to the roughing-out stage to fine-adjust the orientation of the work.

17. Method as in claim 8, wherein the servomechanisms corrects shaft or apparatus errors, precisely orients the work or the wire, precisely compensates for deviations of the wire detected by a wire-position sensor, and corrects offset or fine adjustment cut errors.

18. Method as in claim 1, further comprising the step of determining a width of a gap between the wire and a work piece by measuring at least one electrical parameter of the gap; and initiating at a right angle to the rough cut and at a finishing-cut speed, a superimposed precision servo action over the rough cut to maintain the electric parameter of the gap so as to maintain the width of the gap.

19. Method of precision electric-discharge machining carried out in a machine of moderately high precision and stability with an electrode in the form of a wire, comprising the steps of
rough cutting a work piece at least once;
geometerically referencing the contour of the roughed-out cut in the work piece for polishing the roughed cut;
sensing sound of the discharge above and below the workpiece; and maintaining the sound intensity of the discharge above and below the workpiece at the same level by tilting the wire at a right angle to the roughed cut.

20. Apparatus for electric-discharge cutting with an electrode in the form of a wire or band and with adjustment mechanism (X, Y, U & Z), comprising servo mechanisms (XF & YF and UF & VF) for carrying out fine adjustments of a rough cut by cutting at an angle to the rough cut, and further comprising sensors, for maintaining the distance between the work piece and the wire in the vicinity of the spark constant.

21. Apparatus as in claim 20, further comprising a monitor displaying an outline of the work piece whereby deviations in the fine adjustments being magnified by displaying discrepancies from the outline.

22. Apparatus as in claim 21, comprising an upper photosensor and a lower photosensor each detecting the brightness of the discharge above and below the work piece and maintaining the detected brightness of the discharge above the below the work piece at the same level by tilting the wire at a right angle to the roughed-out cut.

23. Apparatus as in claim 21, wherein the servo mechanisms (XF & YF and UF & VF) are piezo-electric actuators.

24. Apparatus as in claim 21, wherein the servo mechanisms are actuators (XK, YK, UK, & VK) that linearly deform at least one resilient component.

25. Apparatus as in claim 24, wherein the resilient component or components are parts (5, 6, or 7) of the apparatus or of a tool holder (10).

26. Apparatus as in claim 24, wherein the actuators (XK, YK, UK, & VK) are subjected to regulated pneumatic or hydraulic pressure.

27. Apparatus as in claim 24, wherein the actuators (XK, YK, UK, & VK) generate electromagnetic force.

28. Apparatus as in claim 24 wherein the actuators (XK, YK, UK, & VK) generate force by heating and/or cooling and accordingly varying the length of a temperature-sensitive mass.

29. Apparatus as in claim 24 wherein the servo mechanisms (XF & YF and UF & VF) act only by way of the tool holder (10).

30. Apparatus as in claim 20 further including ultrasound detectors above the below the work to detect the intensity of sound of the discharge.

31. Apparatus as in claim 21, further comprising a servo mechanisms for correcting shaft or apparatus errors, orienting the work piece or the wire, compensating for deviations of the wire detected by a wire-position sensor, correcting offset or fine adjustment cut errors.

* * * * *